United States Patent
Dickow et al.

(10) Patent No.: US 10,180,785 B2
(45) Date of Patent: Jan. 15, 2019

(54) GLOBAL AND CONTEXTUAL VEHICLE COMPUTING SYSTEM CONTROLS

(71) Applicant: Myine Electronics, Inc., Ferndale, MI (US)

(72) Inventors: Justin Dickow, Royal Oak, MI (US); Joel J. Fischer, Royal Oak, MI (US)

(73) Assignee: Livio, Inc., Royal Oak, MI (US)

(*) Notice: Subject to any disclaimer, the term of this patent is extended or adjusted under 35 U.S.C. 154(b) by 1105 days.

(21) Appl. No.: 14/271,597

(22) Filed: May 7, 2014

(65) Prior Publication Data
US 2015/0324098 A1     Nov. 12, 2015

(51) Int. Cl.
  *G06F 3/0484* (2013.01)
  *B60K 37/02* (2006.01)
  *G06F 3/0489* (2013.01)

(52) U.S. Cl.
  CPC .......... *G06F 3/04895* (2013.01); *B60K 37/02* (2013.01); *G06F 3/04842* (2013.01); *G06F 3/04847* (2013.01)

(58) Field of Classification Search
  USPC .................................................. 715/700–866
  See application file for complete search history.

(56) References Cited

U.S. PATENT DOCUMENTS

| 6,240,347 | B1 | 5/2001 | Everhart et al. | |
| 2002/0085045 | A1* | 7/2002 | Vong | G06F 3/1431 |
| | | | | 715/840 |
| 2005/0024342 | A1* | 2/2005 | Young | B60K 35/00 |
| | | | | 345/173 |
| 2008/0184166 | A1* | 7/2008 | Getson | G01C 23/005 |
| | | | | 715/810 |
| 2010/0146439 | A1* | 6/2010 | Ariga | G06F 17/30864 |
| | | | | 715/810 |

(Continued)

FOREIGN PATENT DOCUMENTS

WO    2013179635 A1    12/2013

OTHER PUBLICATIONS

Toyota, Toyota Prius C Brochure, 2015, available at http://www.toyota.com/priusc/ebrochure.

(Continued)

*Primary Examiner* — Daniel Samwel
(74) *Attorney, Agent, or Firm* — Jennifer M. Stec; Brooks Kushman P.C.

(57) ABSTRACT

A system may include global controls, each associated with a different one of a plurality of user interface screens of a vehicle; contextual controls, each associated with a command function available from a selected one of the plurality of user interface screens; and a vehicle processor configured to display a current one of the plurality of user interface screens, and update command functions associated with the contextual controls responsive to user input to the global controls. A method may include, responsive to receiving an indication of a user input press of a global control, updating command functions associated with contextual controls in accordance with command function available from a user interface screen associated with the global control; and upon receiving a user input release of the global control within a predetermined threshold period of time, navigating to the user interface screen associated with the global control.

15 Claims, 7 Drawing Sheets

(56) References Cited

U.S. PATENT DOCUMENTS

| | | | |
|---|---|---|---|
| 2011/0060589 A1* | 3/2011 | Weinberg | G01C 21/3608 |
| | | | 704/251 |
| 2013/0219318 A1* | 8/2013 | Schreiber | B60K 35/00 |
| | | | 715/771 |
| 2013/0275924 A1* | 10/2013 | Weinberg | G06F 3/017 |
| | | | 715/863 |
| 2014/0012497 A1 | 1/2014 | Pierfelice | |
| 2014/0024324 A1* | 1/2014 | Mumick | H04M 1/7255 |
| | | | 455/90.1 |
| 2014/0189585 A1* | 7/2014 | Brush | B60R 16/023 |
| | | | 715/808 |
| 2014/0281964 A1* | 9/2014 | Han | G06F 3/016 |
| | | | 715/708 |
| 2014/0282240 A1* | 9/2014 | Flynn, III | G06F 3/0488 |
| | | | 715/810 |

OTHER PUBLICATIONS

Thomas, Mar. 3, 2009, "2010 Toyota Prius Touch Tracer Display," available at https://www.cars.com/articles/2009/03/2010-toyota-prius-touch-tracer-display.

* cited by examiner

GLOBAL AND CONTEXTUAL VEHICLE COMPUTING SYSTEM CONTROLS

TECHNICAL FIELD

This disclosure generally relates to vehicle computing system user interfaces utilizing global controls in combination with contextual controls.

BACKGROUND

A user interface of a vehicle computing system (VCS) may include hard-keys that control certain functions of the VCS. Additionally or alternately, the VCS may utilize a customizable touch-screen interface to control various VCS functions. To access certain features of the VCS, a driver of the vehicle may reach and touch controls of the VCS interface located in the vehicle center stack.

SUMMARY

In an first illustrative embodiment, a system includes global controls, each associated with a different one of a plurality of user interface screens of a vehicle; contextual controls, each associated with a command function available from a selected one of the plurality of user interface screens; and a vehicle processor configured to display a current one of the plurality of user interface screens, and update command functions associated with the contextual controls responsive to user input to the global controls.

In an second illustrative embodiment, a computer-implemented method for a vehicle includes, responsive to receiving an indication of a user input press of a global control, updating command functions associated with contextual controls in accordance with command function available from a user interface screen associated with the global control; and upon receiving a user input release of the global control within a predetermined threshold period of time, navigating to the user interface screen associated with the global control.

In an third illustrative embodiment, a system includes a vehicle processor configured to responsive to receiving an indication of a user input press of a global control of a steering wheel, update command functions associated with contextual controls of the steering wheel in accordance with command functions available from a user interface screen associated with the global control; and upon receiving a user input release of the global control within a predetermined threshold period of time, navigate to the user interface screen associated with the global control.

DETAILED DESCRIPTION

Figure 1:
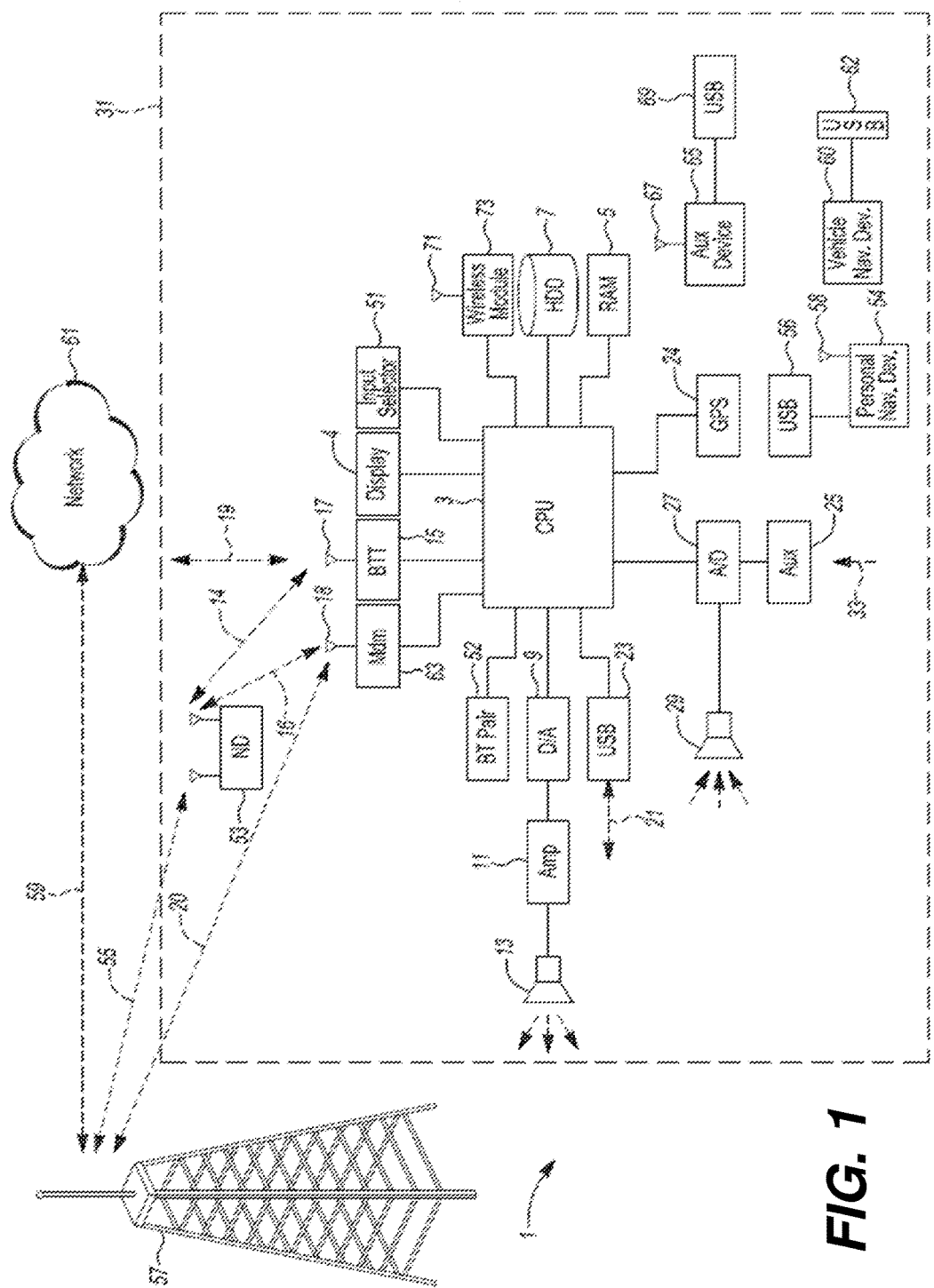
FIG. 1 is an exemplary block topology of a vehicle infotainment system implementing a user-interactive vehicle based computing system.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A VCS user interface may require a driver to perform a reach action towards a touch screen, and then a touch action to select a command to be performed. Such systems may be difficult for drivers to use by muscle memory without looking at the screen. Moreover, the VCS touch-screen display may be cluttered with soft-key identifiers placed in the user interface to identify actions that the driver may take by pressing the soft-keys.

An improved VCS user interface may be configured to be controlled via a first and a second grouping of controls. The first grouping of controls may be referred to as global controls, and the second grouping of controls may be referred to as contextual controls. The global controls may be configured to provide navigation between the various user interface screens of the user interface, while the contextual controls may be configured to provide navigation or function selection within the context of a screen of the user interface. In some cases, the global controls and contextual controls may be included as controls placed on the steering wheel of the vehicle.

To aid the user in understanding what commands may be selected using the contextual controls, the user interface screen may be configured to display indications of the commands associated with the contextual controls for the current user interface screen. In some cases, these indications may be displayed in an orientation consistent with the layout of the contextual controls, such that a user of the system may readily understand the relationship between the contextual controls and the associated commands.

Each of the global controls may be associated with a user interface screen, such that when the global control is pressed, the system may be configured to change the contextual controls to provide functions or commands relevant to the user interface screen associated with the pressed global control. When the commands associated with the contextual controls are changed, the system may be further configured to change the indications of the commands associated with the contextual controls to visually indicate the commands currently corresponding to the contextual controls.

When the global control is released within a predetermined period of time, the system may be configured to change the currently displayed user interface screen to the user interface screen associated with the released global control. As an example, when a music user interface screen is selected (e.g., by a driver pressing and releasing a global control associated with the music user interface screen), the system may navigate the user interface to the music user interface screen and may automatically reconfigure the contextual controls to include available actions relevant to the music user interface screen.

In some cases, the driver may wish to utilize a command for another user interface screen without changing the currently displayed screen of the user interface. To do so, the global controls may be further configured to support reconfiguring the contextual controls without navigating to another user interface screen. As mentioned above, when the global control is pressed, the system may be configured to change the contextual controls to commands relevant to the user interface screen associated with the held down global control. However, when the global control is not released until after expiration of the predetermined period of time, the system may be configured not to change the currently displayed user interface screen to the associated user interface screen. When the global control is finally released, the system may be configured to revert the contextual controls back to the available actions relevant to the current user interface screen. Notably, while the global control is held down, the indication of the functions associated with the contextual controls may be changed to display the commands of the held down global control, rather than those for the current user interface screen.

Thus, the improved VCS user interface reduces the clutter of buttons on the user interface screen, while also enabling convenient control of the VCS user interface from the groupings of controls. Moreover, the global control and contextual control user interface paradigm also enables muscle memory for the user interface that may be unavailable for systems that require a blind reach and touch to make a command selection.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
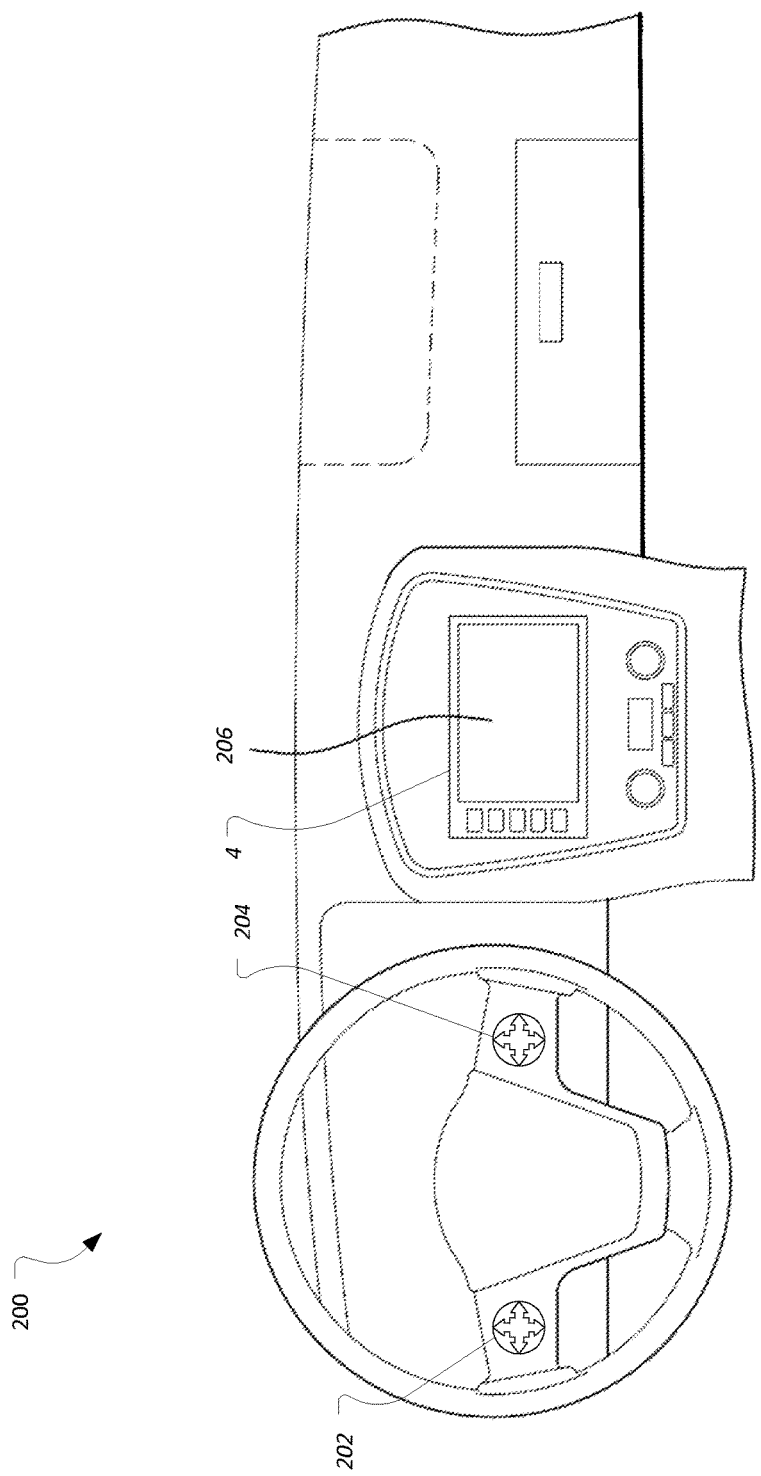
FIG. 2 illustrates an exemplary diagram of a vehicle having global controls, contextual controls, and a display of the vehicle infotainment system for providing user interface screens.

FIG. 2 illustrates an exemplary diagram 200 of a vehicle 31 having global controls 202, contextual controls 204, and a display 4 of a VCS 1 for providing user interface screens 206. The global controls 202 may be configured to provide navigation between the various user interface screens 206 of the user interface displayed by the display 4, while the contextual controls 204 may be configured to provide navigation or function selection within a control context associated with one of the global controls 202.

As illustrated, the global controls 202 may include a global up, a global down, a global left, a global right, and a global center control, each associated with a different user interface screen 206 of the VCS 1. Similarly, the contextual controls 204 may include a contextual up, a contextual down, a contextual left, a contextual right, and a contextual center control, each associated with a different function on the current screen of the VCS 1. It should be noted that different configurations of global controls 202 and contextual controls 204 are possible. For example, the global controls 202 and contextual controls 204 may differ in number and button configuration from the illustrated control layout. As another example, the global controls 202 and contextual controls 204 may differ from one another, such that the global controls 202 and contextual controls 204 differ in one or more of number of controls, type of controls, and layout of controls.

Moreover, while the user interface screens 206 are illustrated in the diagram 200 as being provided on a display 4 of a head unit, it should be noted that other locations and configurations of displays 4 may be utilized. As one example, the user interface screens 206 may be displayed on a display 4 screen (or across multiple display 4 screens) within a gauge cluster or instrument panel cluster of the vehicle 31. As some other examples, the user interface screens 206 may be displayed via a secondary or supplemental display 4 screen or screens otherwise within view of or accessible to the driver of the vehicle 31, such as another display 4 in the center console area or gauge cluster, a display 4 included in another location within vehicle 31 dash, or a popup display 4 screen extending from the vehicle 31 dash.

Figure 3:
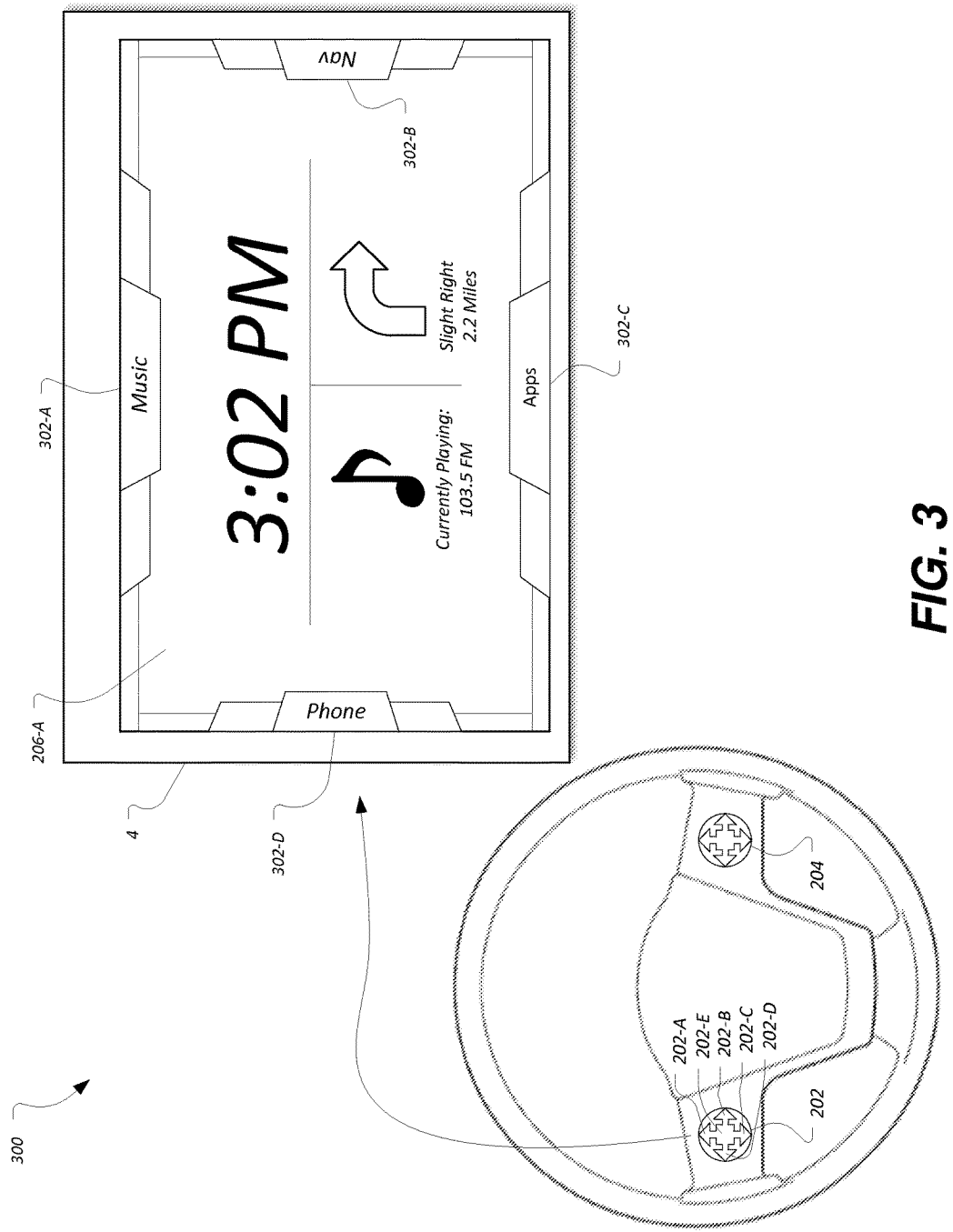
FIG. 3 illustrates an exemplary diagram of a home user interface screen of the vehicle infotainment system including global navigation indications.

FIG. 3 illustrates an exemplary diagram 300 of a home user interface screen 206-A of the VCS 1 including global navigation indications 302-A through 302-D (collectively 302). The home user interface screen 206-A may be configured to display general content regarding the functions of the VCS 1, such as a current time of day, current music being played, and a next navigation action to be performed.

The home user interface screen 206-A may further be configured to display global navigation indications 302 of the other user interface screens 206 that may be navigated to using the global controls 202. The global navigation indications 302 may be displayed in the user interface screen 206 in an orientation consistent with that of the global controls 202, such that a user of the system may readily understand the relationship between the global controls 202 and the associated navigable user interface screens 206. The global controls 202 may accordingly be used by the driver to select which user interface screen 206 should be displayed by the VCS 1 on the display 4.

As illustrated, an indication 302-A at the top of the home user interface screen 206-A may be used to indicate that a music user interface screen 206 would be navigated to if the user selects the up global control 202-A. An indication 302-B at the right of the home user interface screen 206-A may be used to indicate that a navigation user interface screen 206 would be navigated to if the user selects the right global control 202-B. An indication 302-C at the bottom of the home user interface screen 206-A may be used to indicate that a mobile applications user interface screen 206 would be navigated to if the user selects the down global control 202-C. An indication 302-D at the left of the home user interface screen 206-A may be used to indicate that a phone user interface screen 206 would be navigated to if the user selects the left global control 202-D. While not illustrated by an indication 302 in the diagram 300, the center global control 202-E may be used to navigate to the home screen user interface screen 206-A.

Figure 4:
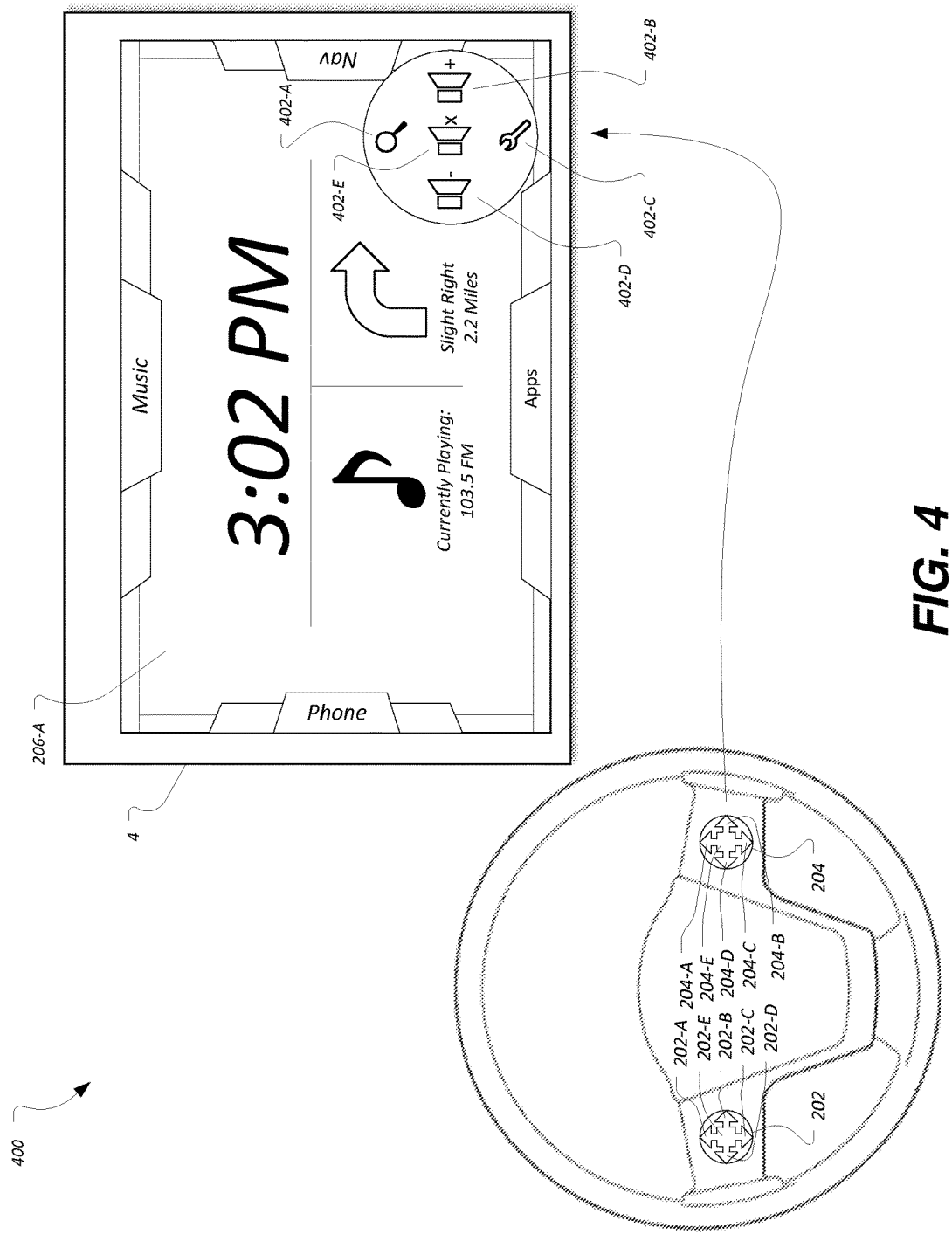
FIG. 4 illustrates an exemplary diagram of the home user interface screen providing contextual navigation indications for the home screen.

FIG. 4 illustrates an exemplary diagram 400 of a home user interface screen 206-A of the VCS 1 including contextual navigation indications 402-A through 402-E (collectively 402) for the home screen 206-A. The home user interface screen 206-A may be configured to display the contextual navigation indications 402 to illustrate what commands of the current user interface screen 206 are available via the contextual controls 204. The indications 302 may be displayed in the user interface screen 206 in an orientation consistent with that of the contextual controls 204, such that a user of the system may readily understand the relationship between the contextual controls 204 and the associated commands. The contextual controls 204 may accordingly be used by the driver to select a command to be performed by the VCS 1.

As illustrated, an up indication 402-A may be used to indicate that a search command would be invoked if the user selects the up contextual control 204-A. A right indication 402-B may be used to indicate that a volume up command would be invoked if the user selects the right contextual control 202-B. A down indication 402-C may be used to indicate that a settings command would be invoked if the user selects the down contextual control 204-C. A left indication 402-D may be used to indicate that a volume down command would be invoked if the user selects the left contextual control 204-D. A center indication 402-E may be used to indicate that a mute command would be invoked if the user selects the center contextual control 204-E.

In some cases, the contextual navigation indications 402 may be displayed substantially the whole time that the user interface screen 206 is displayed. In other cases, the contextual navigation indications 402 may be added to the display upon user interaction with the global controls 202 or contextual controls 204. For instance, the contextual navigation indications 402 may be displayed upon a user pressing one of the global controls 202, upon pressing one of the contextual controls 204, upon changing of the current user interface screen 206, upon a user selecting a help screen function, or upon a user pressing another vehicle 31 user interface control. In some cases, the contextual navigation indications 402 may be configurable to display on the screen for a period of time after an event triggering their appearance, and may be removed from the user interface screen 206 if no user action occurs during that time.

Figure 5:
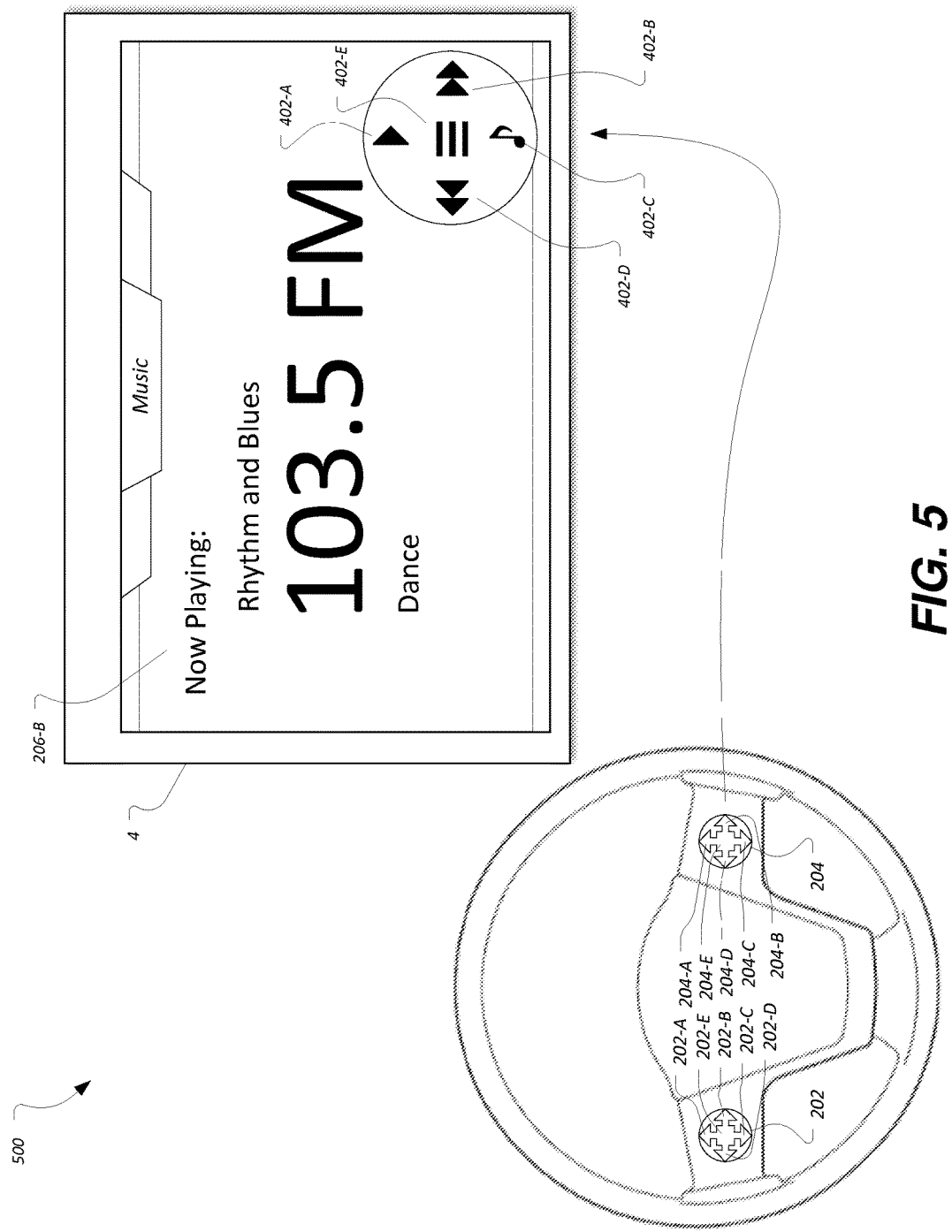
FIG. 5 illustrates an exemplary diagram of the music user interface screen providing contextual navigation indications for the music screen.

FIG. 5 illustrates an exemplary diagram 500 of a music user interface screen 206-B of the VCS 1 including contextual navigation indications 402-A through 402-E (collectively 402) for the music screen 206-B. The music user interface screen 206-B may be displayed, for example, responsive to the user selecting to the global control 202 associated with the music user interface screen 206-B (e.g., the up global control 202-A as illustrated in the diagrams 300 and 400). As with the user interface screen 206-A, the music user interface screen 206-B may be configured to display the contextual navigation indications 402 to illustrate the commands from the current user interface screen 206 that are available to the user. Notably, the contextual navigation indications 402 of the music user interface screen 206-B differ from those of the home user interface screen 206-A, as the commands available from the music user interface screen 206-B differ from those available from the home user interface screen 206-A.

As an example of the contextual controls 204 within the music user interface screen 206-B, the up indication 402-A may be used to indicate that the play command would be invoked if the user selects the up contextual control 204-A. The right indication 402-B may be used to indicate that the fast forward command would be invoked if the user selects the right contextual control 204-B. The down indication 402-C may be used to indicate that the audio source selection command would be invoked if the user selects the down contextual control 204-C. The left indication 402-D may be used to indicate that the rewind command would be invoked if the user selects the left contextual control 204-D. The center indication 402-E may be used to indicate that a media menu command with further options would be invoked if the user selects the center contextual control 204-E.

Thus, by navigating to the music user interface screen 206-B, the VCS 1 may be configured to update the commands associated with the contextual controls 204, to allow the user to select contextual commands that relate to the music user interface screen 206-B. In some cases, however, the user may desire to utilize commands associated with another user interface screen 206, without having to switch which user interface screen 206 is currently being displayed by the VCS 1.

To allow for such a scenario, the global controls 202 may be configured to support an alternate action configured to update the contextual controls 204 without also updating the currently active user interface screen 206. For example, when the VCS 1 detects that a global control 202 is pressed, the VCS 1 may be configured to update the commands associated with the contextual controls 204 to those of the user interface screen 206 associated with the selected global control 202. When the VCS 1 detects that the global control 202 is released within a predetermined threshold period of time (e.g., one second, a half-second, etc.), the VCS 1 may be configured to navigate the currently active user interface screen 206 to the user interface screen 206 associated with the selected global control 202. However, when the VCS 1 detects that a global control 202 is pressed and held down for at least the predetermined threshold period of time, the VCS 1 may be configured to not perform the navigate action, and instead leave the currently active user interface screen 206 as-is. When the global control 202 is finally released after the predetermined threshold period of time, the VCS 1 may be configured to revert the contextual controls 204 back to the commands of the currently active user interface screen 206.

Figure 6:
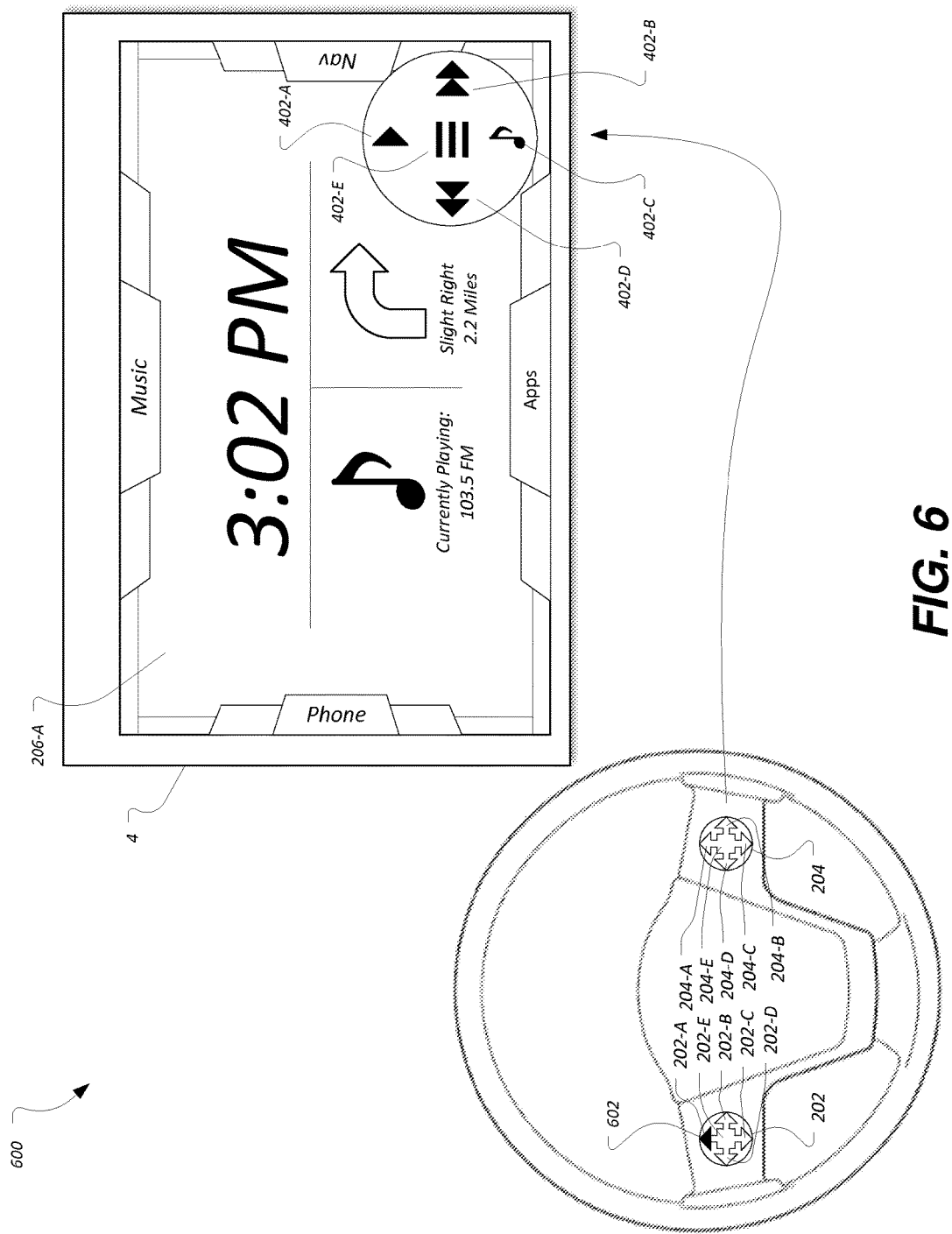
FIG. 6 illustrates an exemplary diagram of the home user interface screen of the including contextual navigation indications for the music screen.

FIG. 6 illustrates an exemplary diagram 600 of the home user interface screen 206-A of the VCS 1 including contextual navigation indications 402-A through 402-E (collectively 402) for the music screen 206-B. As indicated by the graphic 602, the user interface screen 206-A may be displayed with the contextual navigation indications 402 of the music user interface screen 206-B, for example, responsive to the user pressing and holding down the global control 202-A for at least the predetermined threshold period of time. Thus, while holding down the global control 202, the commands of the user interface screen 206 associated with that global control 202 may be available for selection using the contextual controls 204. Moreover, once the global control 202 is released, the commands associated with the contextual controls 204 may revert back to the commands that correspond to the currently active user interface screen 206.

Figure 7:
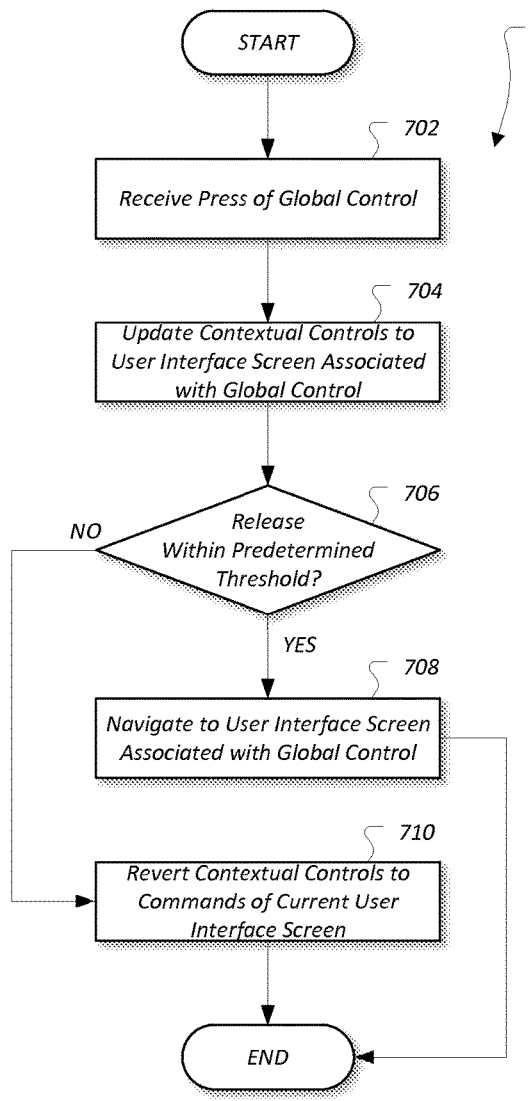
FIG. 7 illustrates an exemplary process for utilizing global controls to update the current user interface screen and contextual controls of the vehicle infotainment system.

FIG. 7 illustrates an exemplary process 700 for utilizing global controls 202 to update the current user interface screen 206 and contextual controls 204 of the VCS 1. The process 700 may be performed, for example, under the control of the processor 3 of the VCS 1.

At operation 702, the VCS 1 receives an indication of a press of a global control 202. For example, the VCS 1 may receive an indication of a press of a global control 202 by the driver to select which user interface screen 206 should be displayed by the VCS 1 on the display 4. The global control 202 may be, for example, a steering wheel global control 202 such as illustrated in the diagrams 200-600.

At operation 704, the VCS 1 updates the contextual controls 204 to conform to the user interface screen 206 associated with the pressed global control 202. For example, and also as illustrated in the diagrams 400 and 500, the VCS 1 may be configured to update the contextual navigation indications 402 to provide indications of the functions of the contextual controls 204 for the music user interface screen 206-B, responsive to the driver pressing the up global control 202-A associated with the music user interface screen 206-B.

At operation 706, the VCS 1 determines whether an indication of a release of the global control 202 was received within a predetermined threshold period of time. For example, the VCS 1 may receive an indication of the driver releasing the global control 202 selected above in operation 702, before a timer initiated when the global control 202 indicates that the predetermined threshold period of time has elapsed. If the release of the global control 202 was received by the VCS 1 within the predetermined threshold period of time, then the VCS 1 may determine that the global control 202 was pressed to change the user interface screen 206 and control passes to operation 708. Otherwise, the VCS 1 may determine that the global control 202 had been held to change the contextual controls 204 but not the user interface screen 206, and control passes to operation 710.

At operation 708, the VCS 1 navigates the display 4 to a user interface screen 206 associated with the pressed global control 202. For example, as illustrated in the diagrams 400 and 500, the VCS 1 may be configured to update the display 4 providing the home user interface screen 206-A to provide the music user interface screen 206-B, responsive to the driver pressing the up global control 202-A associated with the music user interface screen 206-B. After operation 708, the process 700 ends.

At operation 710, the VCS 1 reverts the contextual controls 204 to conform to the commands of the current user interface screen 206. For example, upon release of the held global control 202-A illustrated in the diagram 600, the VCS 1 may be configured to update the contextual navigation indications 402 to again provide indications of the functions of the contextual controls 204 for the home user interface screen 206-B. After operation 710, the process 700 ends.

Figure 8:
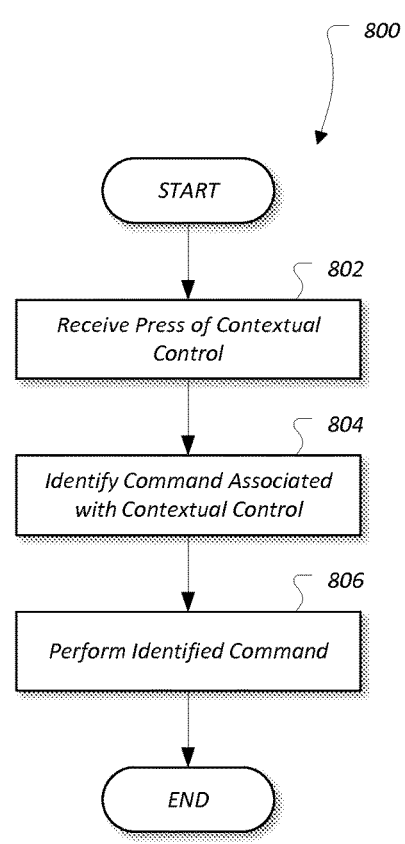
FIG. 8 illustrates an exemplary process for utilizing contextual controls to provide commands to the vehicle infotainment system.

FIG. 8 illustrates an exemplary process 800 for utilizing contextual controls 204 to provide commands to the VCS 1. As with the process 700, the process 800 may be performed, for example, under the control of the processor 3 of the VCS 1.

At operation 802, the VCS 1 receives a press of a contextual control 204. For example, the VCS 1 may receive an indication of a press of a contextual control 204 by the driver to select a command to be performed according to the currently assigned function of the contextual control 204. The contextual control 204 may be, for example, a steering wheel contextual control 204 such as illustrated in the diagrams 200-600.

At operation 804, the VCS 1 identifies the command associated with the pressed contextual control 204. In some cases, the VCS 1 may identify the command as a function assigned to the contextual control 204 according to navigation to the current user interface screen 206, while in other cases, the VCS 1 may identify the command as a function assigned according to the user holding down one of the global controls 202 to access a command from a user interface screen 206 other than the user interface screen 206 currently being displayed.

At operation 806, the VCS 1 performs the identified command. For example, the VCS 1 may raise or lower the volume, mute the current music, search, fast forward, choose a media source, or any other command available by way of the contextual control 204. After operation 806, the process 800 ends.

Thus, the improved VCS 1 user interface may utilize global controls 202 and contextual control 204 to reduce the clutter of buttons on the display 4, while also enabling convenient control of the user interface screens 206 of the VCS 1. Moreover, because the global controls 202 and contextual control allow the driver to access commands without having to reach to the display 4 of the VCS 1, the improved VCS 1 user interface additionally enables muscle memory that may be unavailable for system that require a blind reach and touch to make a command selection.

In general, computing systems and/or devices, such as the VCS 1, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices such as the VCS 1 generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a display;
global controls, each associated with a different one of a plurality of user interface screens of a vehicle to be provided to the display;
contextual controls, each associated with a command function available from a selected one of the plurality of user interface screens; and
a vehicle processor configured to
provide a first one of the screens to the display,
responsive to receipt of a button press of a global control associated with a second one of the screens, transition the contextual controls to command functions available from the second one of the screens and display contextual navigation indications to illustrate the available command functions of the second one of the screens,
responsive to release of the global control within a predefined time period, provide the second one of the screens to the display,
responsive to continued button press of the global control beyond the predefined time period, continue to provide the first one of the screens to the display along with continued display of the contextual navigation indications to illustrate the available command functions of the second one of the screens, and
responsive to release of the global control beyond the predefined time period, transition the contextual controls back to command functions available from the first one of the screens.

2. The system of claim 1, wherein the vehicle processor is further configured to provide to the display, in an orientation consistent with that of the global controls, global navigation indications indicating a relationship between the global controls and associated user interface screens.

3. The system of claim 1, wherein the vehicle processor is further configured to provide to the display, in an orientation consistent with that of the contextual controls, the contextual navigation indications of the command functions currently associated with the contextual controls.

4. The system of claim 1, wherein the vehicle processor is further configured to:
receive an indication of a user input press of one of the contextual controls;
identify a command function currently associated with the one of the contextual controls; and
perform the command function.

5. A method comprising:
displaying a first screen;
responsive to a press of a global control corresponding to a second screen, updating command functions for contextual controls and contextual navigation indications to command functions of the second screen;
upon receiving a release of the global control within a predetermined threshold period of time, navigating to the second screen;
responsive to continued button press of the global control beyond the period of time, continue to provide the first screen to the display along with continued display of the contextual navigation indications to illustrate the available command functions of the second screen; and
upon receiving the release after the period of time, reverting the command functions to those of the first screen.

6. The method of claim 5, further comprising displaying, in an orientation consistent with that of the global control, global navigation indications indicating a relationship between the global control and associated user interface screens.

7. The method of claim 5, further comprising displaying, in an orientation consistent with that of the contextual controls, the contextual navigation indications of the command functions associated with the contextual controls for the user interface screen.

8. The method of claim 5, further comprising:
receiving an indication of a user input press of one of the contextual controls;
identifying a command function currently associated with the one of the contextual controls; and
performing the command function.

9. The method of claim 5, wherein the predetermined threshold period of time is one second.

10. A system comprising:
a vehicle processor configured to
provide a first screen to a vehicle display;

responsive to receiving an indication of a user input press of a global control of a steering wheel corresponding to a second screen, update command functions associated with contextual controls of the steering wheel and contextual navigation indications in accordance with command functions available from the second screen;

upon receiving a user input release of the global control within a predetermined threshold period of time, navigate the vehicle display to the second screen;

responsive to continued button press of the global control beyond the threshold period of time, continue to provide the first screen to the display along with continued display of the contextual navigation indications to illustrate the available command functions of the second screen; and upon receiving the release after the period of time, revert the command functions to those of the first screen.

11. The system of claim 10, wherein the vehicle processor is further configured to display, in an orientation consistent with that of the global controls, global navigation indications indicating a relationship between the global controls and associated user interface screens.

12. The system of claim 10, wherein the vehicle processor is further configured to display, in an orientation consistent with that of the contextual controls, the contextual navigation indications of the command functions associated with the contextual controls.

13. The system of claim 10, wherein the vehicle processor is further configured to:
  receive an indication of a user input press of one of the contextual controls;
  identify a command function currently associated with the one of the contextual controls; and
  perform the command function.

14. The system of claim 10, wherein the predetermined threshold period of time is one second.

15. The system of claim 10, wherein the vehicle display includes at least one of: (i) a display of a head unit of the vehicle, (ii) a display within a gauge cluster of the vehicle, and (iii) a secondary display screen of the vehicle configured to be within view of a driver of the vehicle.

\* \* \* \* \*